US00RE45475E

(19) United States
(12) Reissued Patent
Schymura

(10) Patent Number: US RE45,475 E
(45) Date of Reissued Patent: Apr. 21, 2015

(54) FRAME ASSEMBLY MOUNTABLE TO AN OBJECT

(76) Inventor: Margarete Schymura, New York, NY (US)

(21) Appl. No.: 13/475,549

(22) Filed: May 18, 2012

Related U.S. Patent Documents

Reissue of:
(64) Patent No.: 8,104,208
Issued: Jan. 31, 2012
Appl. No.: 12/283,126
Filed: Sep. 8, 2008

U.S. Applications:
(63) Continuation-in-part of application No. 10/580,897, filed as application No. PCT/US2004/042503 on Dec. 17, 2004, now Pat. No. 7,421,810.

(60) Provisional application No. 60/531,336, filed on Dec. 19, 2003.

(51) Int. Cl.
*A47G 1/06* (2006.01)
*G09F 23/00* (2006.01)

(52) U.S. Cl.
CPC ..... *G09F 23/00* (2013.01)

(58) Field of Classification Search
USPC ..... 40/306, 310, 324, 607.12, 607.14, 660, 40/661.05, 738
See application file for complete search history.

(56) References Cited

U.S. PATENT DOCUMENTS

| | | | | |
|---|---|---|---|---|
| 1,580,496 | A | 4/1926 | Kelly | |
| 1,648,978 | A * | 11/1927 | Zierenberg | 40/700 |
| 1,649,415 | A | 11/1927 | Moseson | |
| 1,752,297 | A | 4/1930 | Gillette | |
| 1,858,975 | A * | 5/1932 | Ta Bois | 40/582 |
| 3,411,226 | A | 11/1968 | Ericsson | |
| 3,694,947 | A * | 10/1972 | Mukai | 556/130 |
| 3,879,874 | A | 4/1975 | Broussard | |
| 3,885,336 | A * | 5/1975 | Olsen | 40/711 |
| 6,276,084 | B1 | 8/2001 | Lanier | |
| 6,293,038 | B1 | 9/2001 | Chang | |
| 6,439,520 | B1 | 8/2002 | Johnson | |
| 6,742,294 | B1 * | 6/2004 | Fossum | 40/611.1 |
| 2001/0005953 | A1 | 7/2001 | Painsith | |
| 2003/0196365 | A1 | 10/2003 | Bracker et al. | 40/738 |
| 2003/0213155 | A1 * | 11/2003 | Kaulbach | 40/660 |
| 2005/0229449 | A1 * | 10/2005 | Shepley | 40/306 |

FOREIGN PATENT DOCUMENTS

| | | |
|---|---|---|
| GB | 274117 | 2/1928 |

* cited by examiner

*Primary Examiner* — Joanne Silbermann
(74) *Attorney, Agent, or Firm* — VLP Law Group LLP; Kent H. Cheng

(57) ABSTRACT

A picture frame assembly includes a backing plate having a front surface, a rear surface, and a plurality of parallel grooves in one of the surfaces. The material and thickness of the backing plate are chosen so that the backing plate can be plastically deformed about a bending axis parallel to the grooves. At least one frame element, which can be formed integrally with the backing plate, is for provided for retaining a planar picture element against the front surface of the backing plate. A fastener extends from the rear surface for mounting the assembly to any of various objects, such as a tree, flower stem, a candle, a vase, a basket, a gift wrapping device, a container, a column, and furniture.

27 Claims, 18 Drawing Sheets

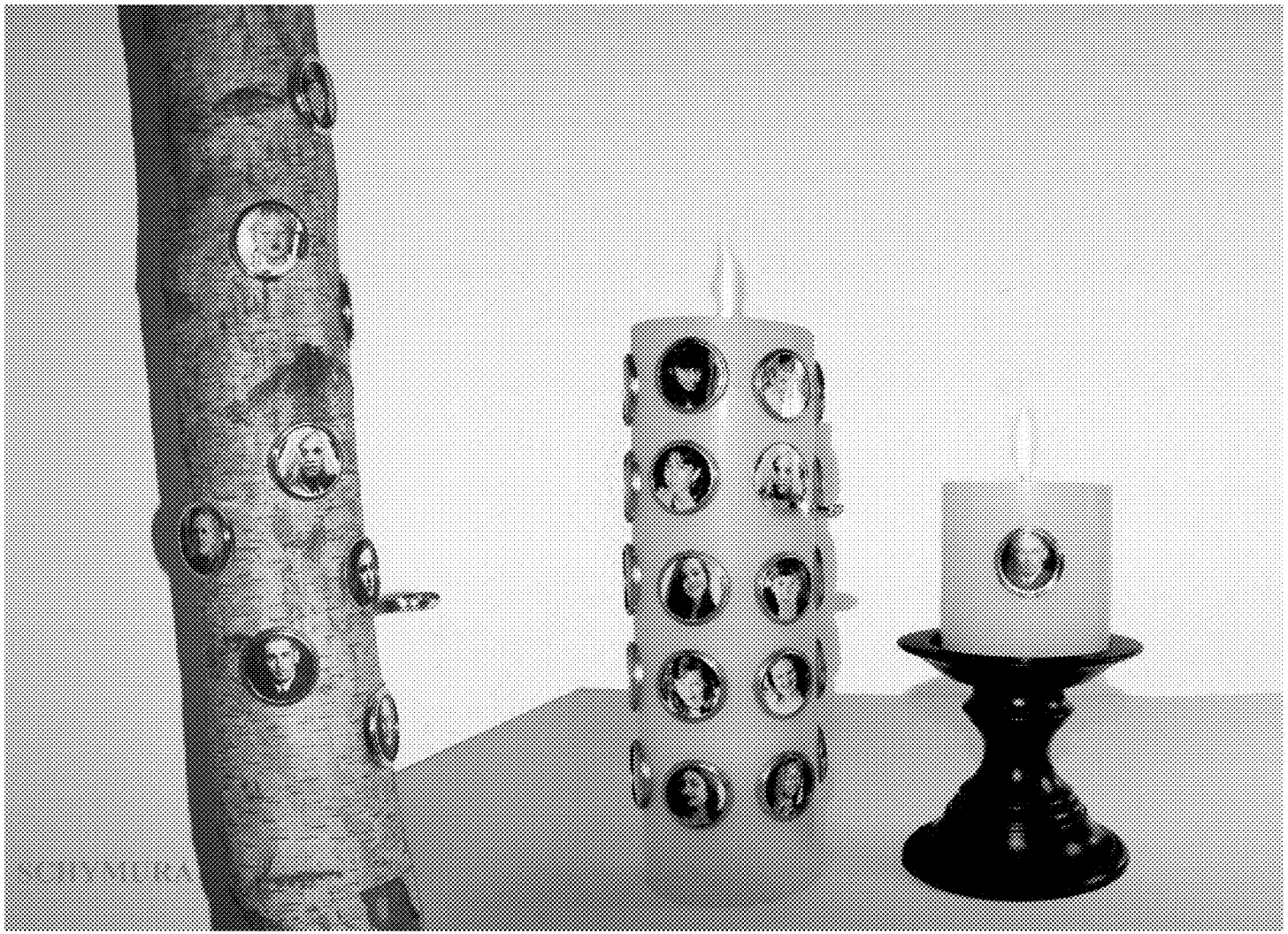
Fig. 3D (New)

Fig. 4E
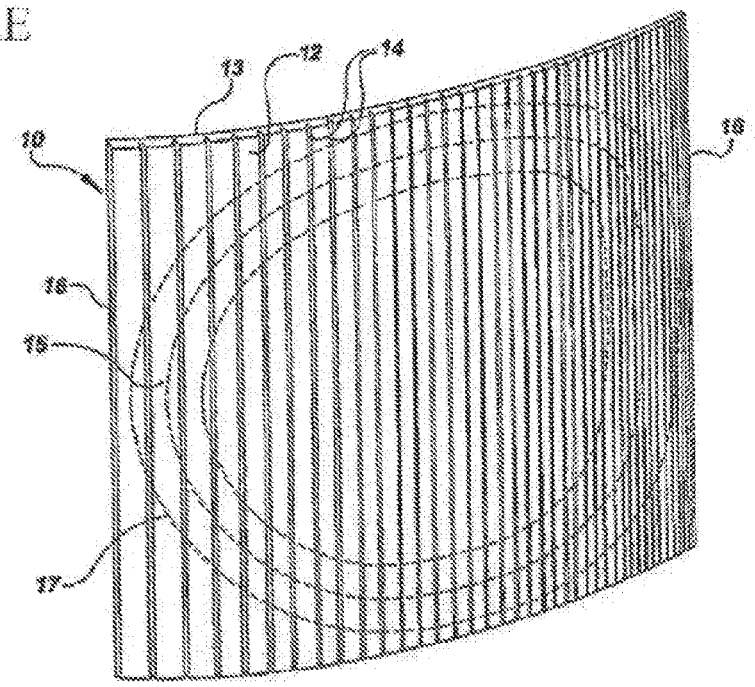
Fig. 4F
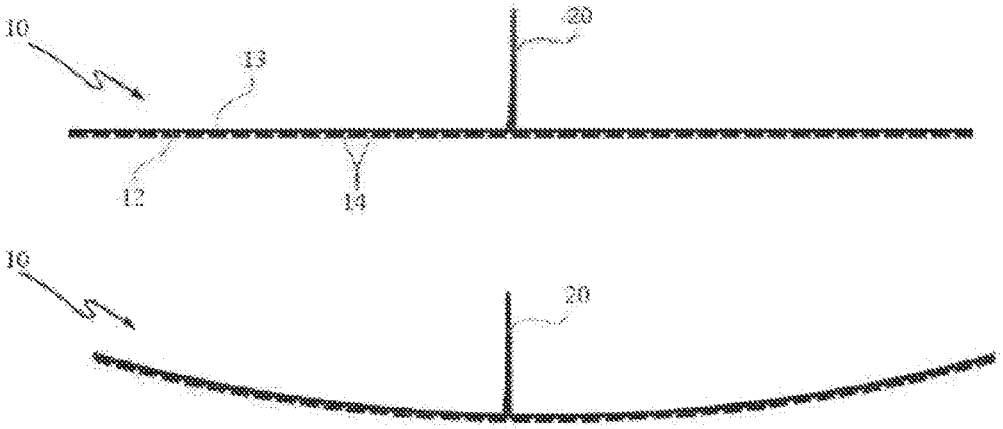
Fig. 4G

FRAME ASSEMBLY MOUNTABLE TO AN OBJECT

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This patent application is a continuation-in-part of U.S. patent application Ser. No. 10/580,897 filed Sep. 11, 2006 now U.S. Pat. No. 7,421,810 which is a U.S. national stage of International Patent Application No. PCT/US04/42503 filed Dec. 17, 2004 claiming priority to U.S. Provisional Patent Application No. 60/531,336 filed Dec. 19, 2003.

BACKGROUND OF THE INVENTION

1. Field of the Invention

The invention relates generally to a frame assembly. In particular, the invention relates to a picture frame assembly of the type that can be readily mounted onto an object.

2. Description of the Related Art

Picture frame assemblies including a backing plate and a frame element for retaining a photograph or other planar picture element against the backing element are well known. Such frame assemblies include means for retaining the backing element in the frame, and can include a sheet of glass or other transparent material over the picture element. Because picture frames come in assorted shapes and sizes and are generally flat, picture frames can be hung flush with a flat surface.

Miniature picture frames are also well known, and are sometimes used as part of a memorabilia display and as elements of memorials. It is sometimes desired to fix the picture frame to an object, such as a tree, flower stem, a candle, a vase, a basket, a gift wrapping, a container, a column, and furniture. Picture frame assemblies which fit flush against a cylindrical object, in particular a picture frame assembly which can be readily adjusted to any desired radius of curvature, are not available.

SUMMARY OF THE INVENTION

It is an object of the invention to provide a picture frame assembly which can be readily mounted to an object, such as a tree, flower stem, a candle, a vase, a basket, a gift wrapping device, a container, a column, and furniture.

It is another object of the invention to provide a picture frame assembly having a fastening element configured to be mounted onto an object having either a flat or curved surface, to which the picture frame assembly is attached.

It is a further object of the invention to provide a picture frame assembly which can be configured to conform to a curved surface of an object, to which the picture frame assembly is mounted. For example, the picture frame assembly can have a deformable frame and/or backing plate, which can be plastically deformed to a desired radius of curvature.

As described in the various embodiments below, a picture frame assembly is provided and comprises a frame element and a backing plate for retaining a picture element therebetween. One or more fastening elements can be fixed to one of the frame element and the backing plate for mounting the picture frame assembly to an object, such as a tree, flower stem, a candle, a vase, a basket, a gift wrapping device, a container, a column, and furniture.

The fastening elements can be in any of various forms, such as mounting pins, mounting prongs, mounting ties (e.g., strings, wires, and ribbons, a magnetic element, hook-and-loop type fasteners, or adhesive tapes (e.g., double-sided adhesive tapes). The fastening elements can be formed separately and/or discretely and fixed to the backing plate of the picture frame assembly. For example, the fastening element can be soldered to the backing plate. In another example, the fastening element can be integrally formed with the backing plate of the picture frame assembly.

Additionally or alternatively, the backing plate and/or the frame element can be formed to conform to a surface of the object to which the frame assembly is mounted. In one embodiment, the frame element can be configured to assume a curved shape for mounting onto a curved surface of an object. In a preferred embodiment, frame elements are formed integrally with the backing plate by bending along grooves parallel to lateral edges. In another embodiment, a transparent curved frame plate has lateral edges formed with clips which receive the lateral edges of the backing plate.

The backing plate can have front and rear surfaces. In one embodiment, a plurality of parallel ribs and grooves are formed in one of the surfaces. The material and thickness of the backing plate are chosen so that the backing plate can be plastically deformed about a bending axis parallel to the grooves, while the ribs between the grooves are sufficiently stiff to resist bending about other axes. Such plastically deformed backing plate can conform to a curved surface of the object, to which the picture frame assembly is mounted. In another embodiment, the backing plate can have a pre-fixed curved shape.

According to one embodiment, a frame plate having an apertures formed as one piece with the backing plate and connected to the backing plate by a fold so that a planar picture element and a protective transparent sheet can be sandwiched between the front surface of the backing plate and the rear surface of the frame plate. The frame plate preferably has retaining tabs which can be folded against the rear surface of the backing plate to retain the picture element.

According to another embodiment designed for an object having a known diameter, such as a candle, a frame element can be provided with a curved frame plate having an aperture therein and a surrounding wall having an edge with a radius of curvature which is smaller than that of the frame plate. The edge is provided with retaining tabs which are deformed to bear against the rear surface of the backing plate, which is received within the surrounding wall. The backing plate can be formed to have a curvature similar to or be deformable to conform to the curvature of the frame plate. Thereby the backing plate can assure that a picture element will be held flush against the rear surface of the frame plate, together with an optional transparent sheet, giving a neat appearance.

BRIEF DESCRIPTION OF THE DRAWINGS

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein. In the drawings:

*FIG. 3D is a photo of the third embodiment as depicted in FIG. 3C mounted on various cylindrical objects;*

FIG. 4E is a perspective view of a backing plate;

FIG. 4F is a top view of the backing plate of FIG. 4E prior to bending;

FIG. 4G is a top view of the backing plate of FIG. 4E after bending;

DETAILED DESCRIPTION OF THE EMBODIMENTS

Figure 1A:
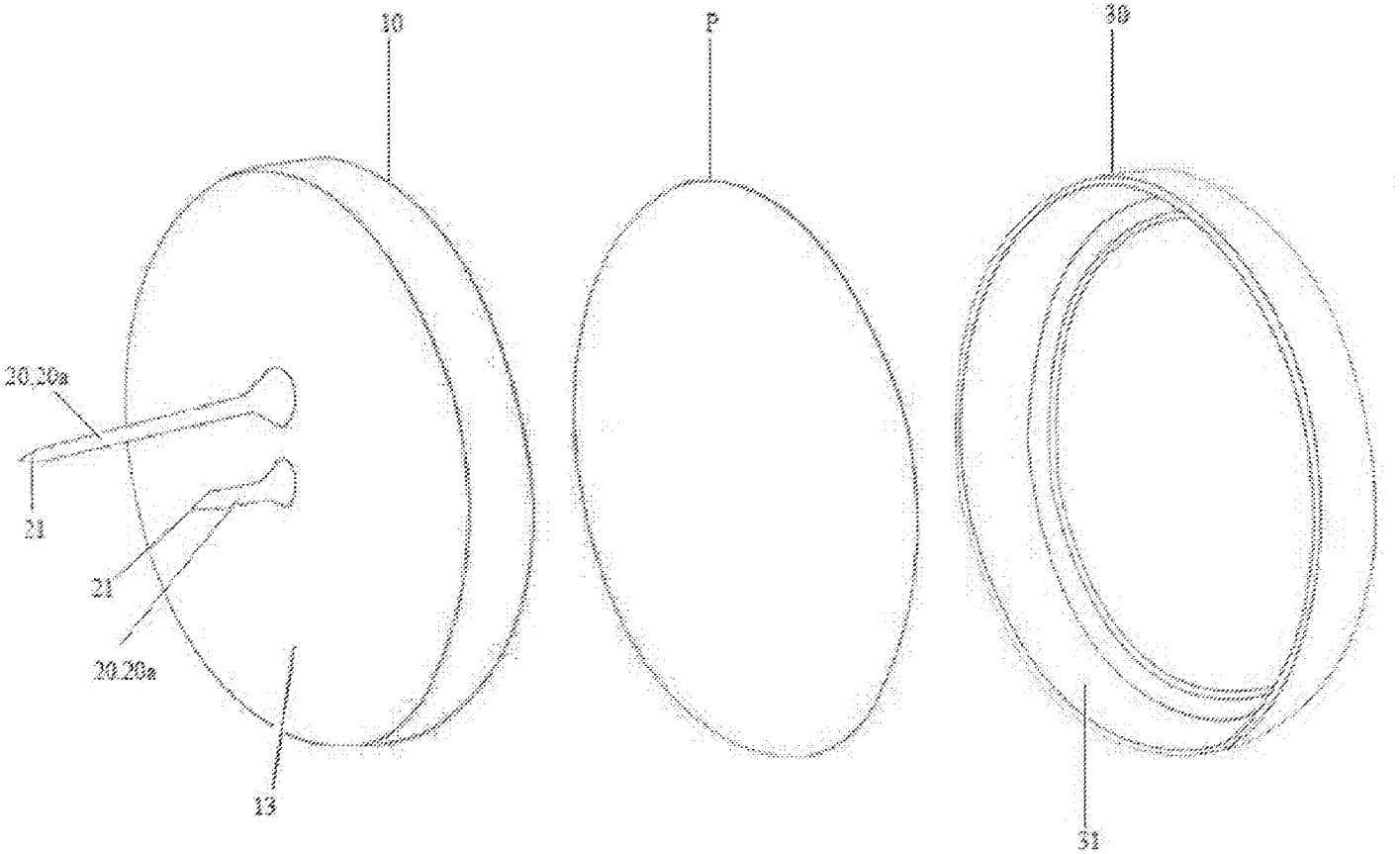
FIG. 1A is an exploded perspective view of a picture frame assembly formed according to a first embodiment.

FIG. 1A shows a first embodiment of a picture frame assembly having a backing plate 10 and a frame element 30 to hold a picture P element therebetween. In the example shown in FIG. 1A, the backing plate 10 can be received inside a surrounding wall 30a of the frame element 30 and retained therein by any of various conventional methods. For example, the backing plate 10 can be retained inside the surrounding wall 31 through friction engagement. The backing plate 10 and the frame element 30 can be configured in various forms. For example, the backing plate 10 can be either rigid or deformable. Additionally or alternatively, the frame element 30 can be a rigid or deformable member having a flat front surface 31, as is shown in FIG. 1D, or a curved front surface 31' as is shown in FIG. 2D. The details of the backing plate 10 and the frame element 30 will be described in the following various embodiments.

The picture frame assembly includes one or more fastening elements 20 fixed to one of the backing plate 10 and the frame element 30. The fastening elements 20 allow the picture frame assembly to be readily mounted onto an object, such as a tree, flower stem, a candle, a vase, a basket, a gift wrapping device, a container, a column, and furniture.

The fastening elements 20 can be in various forms. In the example of FIG. 1A, the fastening elements 20 are formed as mounting pins 20a, 20a'. The mounting pins 20a can have sufficient rigidity to allow the mounting pins 20a, 20a' to penetrate into the object to which the picture frame assembly is to be mounted. For example, the mounting pins 20a, 20a' can be made of a metal or plastic material. The mounting pins 20a, 20a' can also have pointed tips 21 to facilitate in piercing into the object. The mounting pins 20a, 20a' can be formed to extend normally of the rear surface 13 of the backing plate 10. As FIG. 1A shows, the mounting pins 20a, 20a' are preferably of different lengths, the longer element 20a assuring good retention, the shorter element 20a' serving primarily as an orientation feature. The mounting pins 20a, 20a' can be either separately formed and attached to the backing plate 10, such as by soldering, or integrally formed with the backing plate 10, such as by molding.

Figure 1B:
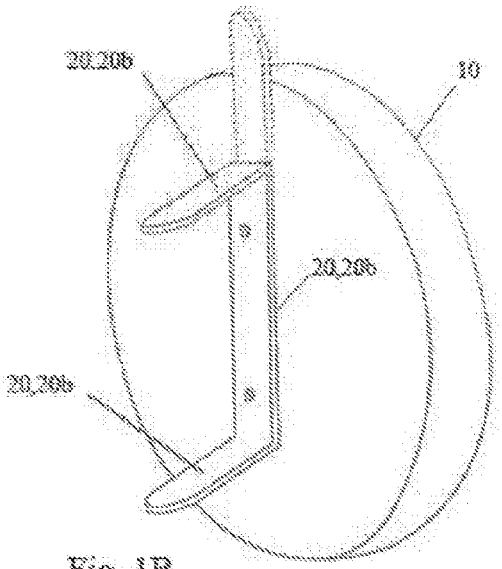
FIGS. 1B to 1D show alternative embodiments of the fastening element.
Figure 1C:
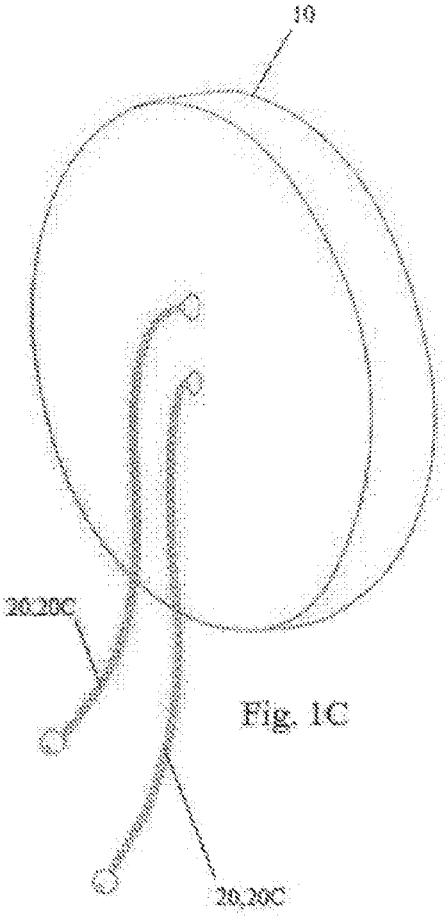
Figure 1D:
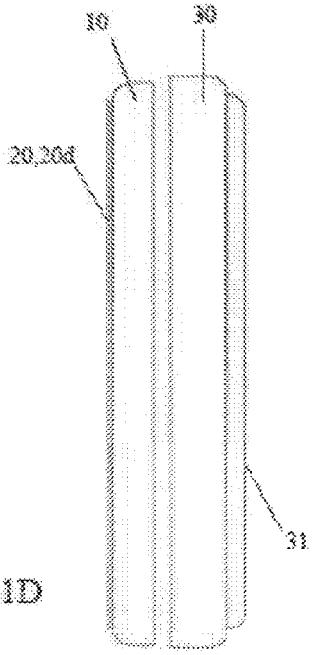

FIGS. 1B to 1D show alternative embodiments of the fastening elements 20. In the example of FIG. 1B, the fastening element 20 has a U-shape bracket 20b with two mounting prongs 22b. The U-shaped bracket 20b can be fixed onto the backing plate 10 by any of conventional means, such as screws or adhesion. In one example, the mounting prongs 22b can have sufficient rigidity to allow penetration into the object to which the picture frame assembly is to be mounted. In another example, the mounting prongs 22b can be formed of a material that is plastically deformable. In such a case, the mounting prongs 22b can be bent toward the rear surface 13 of the backing plate 10, as is shown in phantom in FIG. 1B.

FIG. 1C shows that the fastening elements 20 can be formed as flexible ties 20c, such as strings, wires, ribbons, and etc. In one example, the fastening tires 20c can go around the object, such as a tree branch and a gift wrapping device, and be tied to each other so as to retain the picture frame assembly to the object.

FIG. 1D shows that the fastening element 20 is a thin fastening sheet 20d fixed to the rear surface 13 of the backing plate 10. For example, the fastening sheet 20d can be an adhesive tape (e.g., a double-sided tape), a hook-and-loop type fastener, a magnetic sheet material, and etc. In one example, the fastening sheet 20d can cover the entire rear surface 13 of the backing plate 10.

FIGS. 2A to 2D illustrate a picture frame assembly formed according to a second embodiment. In this embodiment, the surrounding wall 30a of the frame element 30 is profiled to conform to a curved surface of the object, to which the picture frame assembly is to be mounted. For example, the height of the surrounding wall 30a reduces from the two opposite sides toward the top and bottom portions of the frame element 30. When the top and bottom portions of the frame element 30 are placed against an axial direction of a cylindrical surface, the surrounding wall 30a hugs the cylindrical surface in a circumferential direction, resulting in a smooth fitting between the frame assembly and the cylindrical object.

Figure 2A:
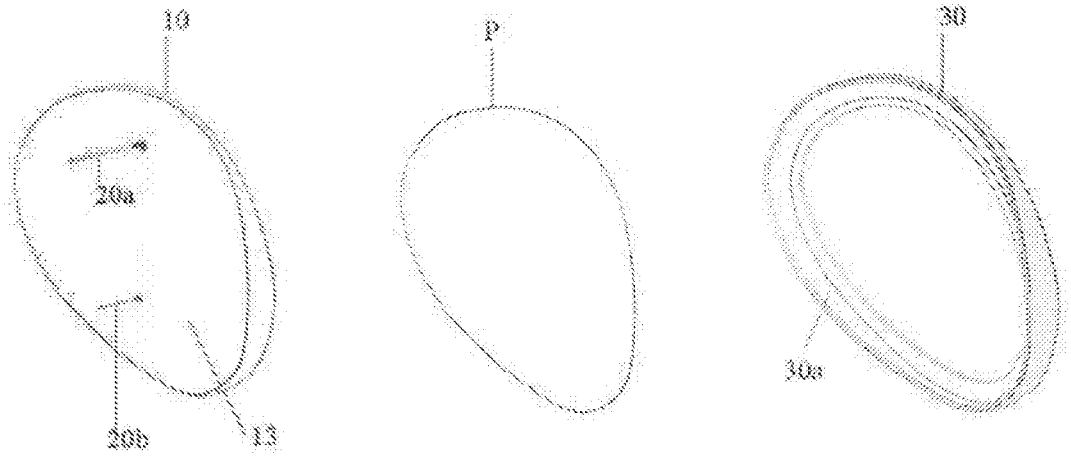
FIG. 2A is an exploded perspective view of a picture frame assembly formed according to a second embodiment.
Figure 2B:
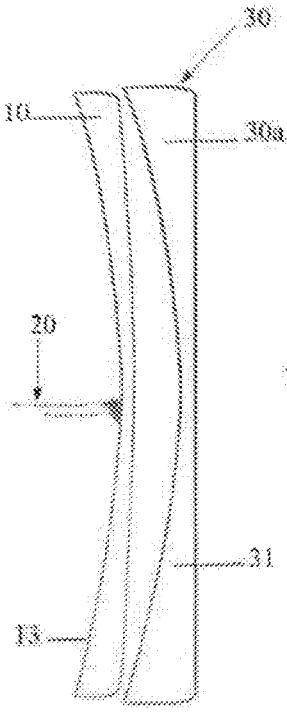
FIGS. 2B and 2C are top views of the FIG. 2A picture frame assembly before and after assembling.
Figure 2C:
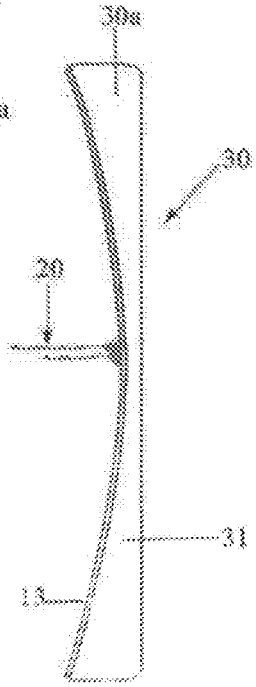
Figure 2D:
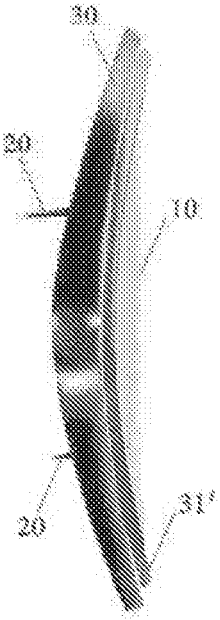
FIG. 2D is a side view of the FIG. 2A picture frame assembly after being assembled.

In the example shown in FIGS. 2B and 2C, the front surface 31 of the frame element 30 can be substantially flat. When the frame element 30 of FIGS. 2B and 2C is made of rigid material and thus not subject to bending, the backing plate can be also be rigid. In the example shown in FIG. 2D, the front surface 31' is curved.

In a preferred embodiment, the backing plate 10 can be similarly configured to be adapted to the profiled surrounding wall 30a of the frame element 30. For example, the thickness of the backing plate 10 can reduce from the two opposite sides toward the top and bottom portions of the backing plate 10, as is shown in FIG. 2B. In the example of FIG. 2B, the backing plate 10 is formed to have a curved rear surface 13 to confirm to a similarly curved surface of the object, to which the frame assembly is mounted. Such a profiled backing plate 10 can coextend with the surrounding wall 31 to result in a smooth finish and enhance the aesthetic appeal of the picture frame assembly, as is shown in FIGS. 2C and 2D.

Figure 3A:
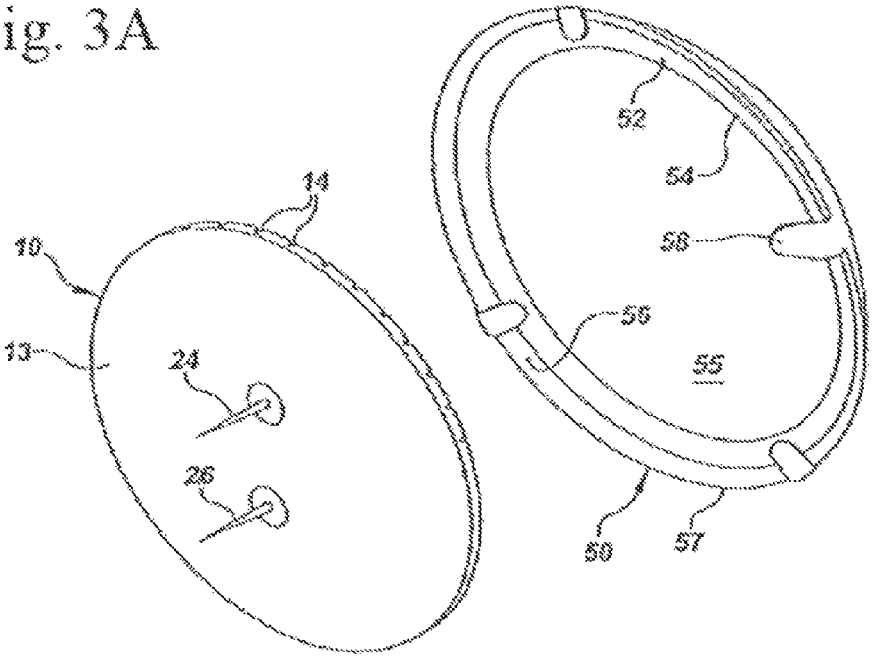
FIG. 3A is an exploded perspective view of a third embodiment having a curved frame plate and surrounding wall.
Figure 3B:
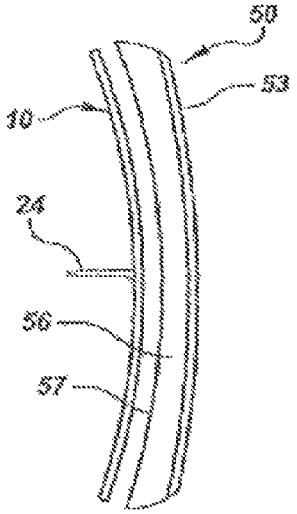
FIG. 3B is a top view of the third embodiment shown in FIG. 3A.

FIGS. 3A and 3B show a third embodiment of a frame assembly, in which the frame element 50 includes a curved frame plate 52 having a front surface 53 and a rear surface 54 which receives a planar picture element visible through aperture 55, possibly with a protective transparent sheet. A surrounding wall 56 extends rearward from the periphery of the frame plate 52 to an edge 57 lying in a cylindrical plane having a radius of curvature which is smaller than that of the frame plate 52.

The backing plate 10 is received within the surrounding wall 56 and held against the frame plate 52 by plastically deformable retaining tabs 58 extending from the edge 57. As is discussed below, the retaining tabs 58 can also be separately formed and attached to the frame plate 52 by conventional fasteners such as nail elements. Additionally or alternatively, the retaining tabs 58 can be formed in various shapes such as a loop shape.

In one example, the frame element 50 is not intended to be deformed by a user, the radius of curvature of the rear edge 57 is preferably chosen to correspond to the diameter of a particular object to be decorated, in particular a candle. This makes it possible to create a stylish memorial utilizing a photograph of a loved one. In another example as best shown in FIG. 3B, the surrounding wall 56 has its lowest height along a line formed by the two mounting pins 24, 26.

The backing plate 10 is shown with mounting pins 24, 26, which can be soldered or brazed to the rear surface 13 of the backing plate 10. Other fastening elements 20, such as those shown in FIGS. 1A to 1D and described above, can also be used.

Figure 3C:
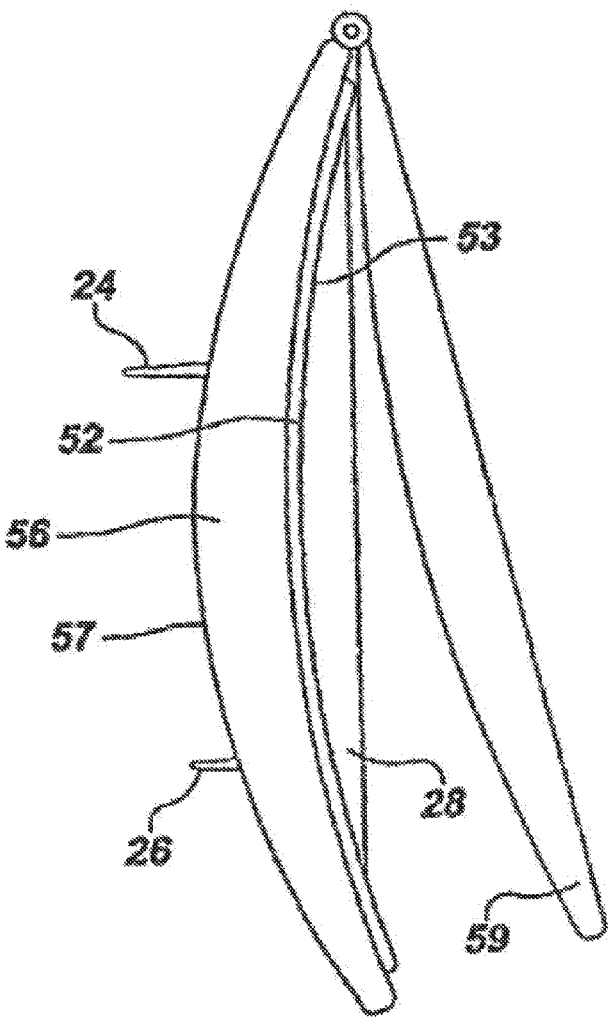
FIG. 3C is a side view of a modified picture frame assembly having a cover hinged to the frame element.

FIG. 3C shows a modification of the picture frame assemblies of FIGS. 2A to 2D, 3A, and 3B, wherein a cover 59 is hinged to the frame element 50 to form a locket. A gasket can also be provided to protect the aperture from exposure to the elements. Gaskets or adhesive seals can also be provided in any embodiment wherever it is desired to prevent influx of moisture.

Figure 4A:
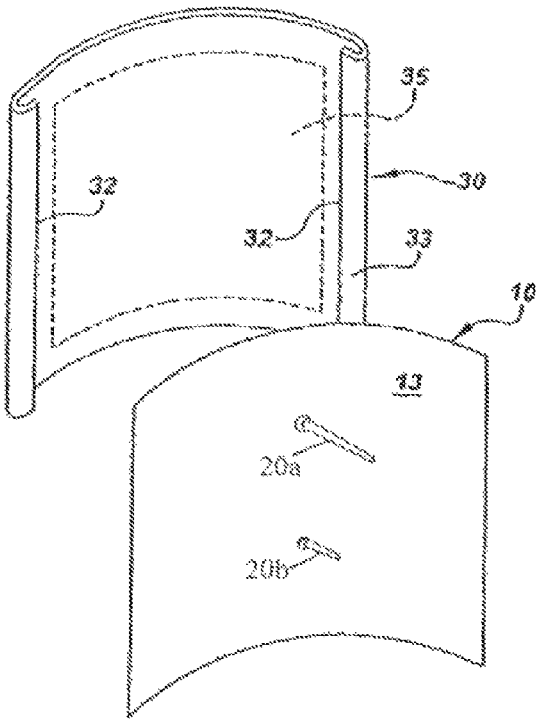
FIG. 4A is an exploded perspective view of a fourth embodiment of a picture frame assembly according to the invention.
Figure 4B:
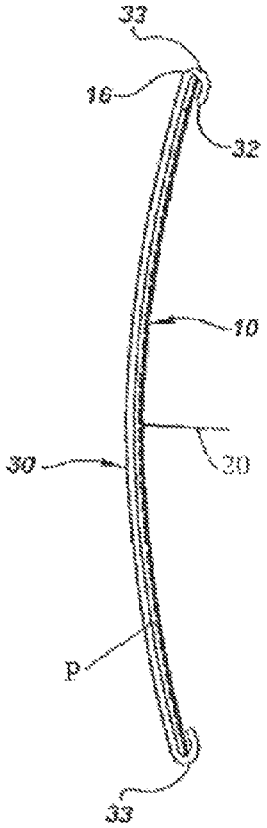
FIG. 4B is a top view of the fourth embodiment shown in FIG. 4A.

FIGS. 4A to 4G show a fourth embodiment of a picture frame assembly. FIGS. 4A and 4B show a frame assembly before and after assembling. The frame assembly includes the backing plate 10 and a frame element 30, which will be described in greater details below in connection with FIGS. 4C to 4J. As FIG. 4B shows, a planar picture element P such as a photograph can be received substantially flushly against the backing plate 10 between the backing plate 10 and the frame element 30. The frame assembly includes one or more fastening elements 20, such as any of those described above.

Figure 4C:
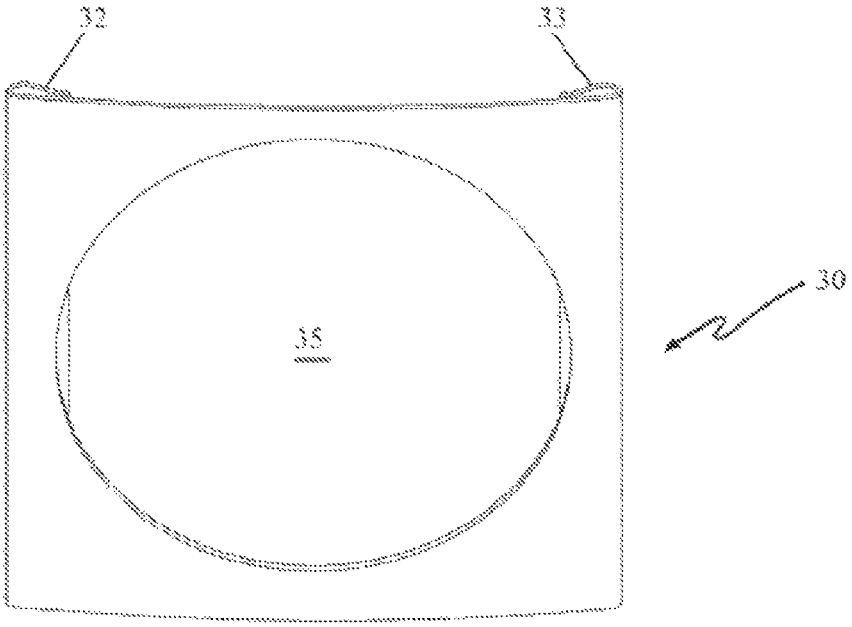
FIG. 4C is a perspective view of a frame plate in a first position.
Figure 4D:
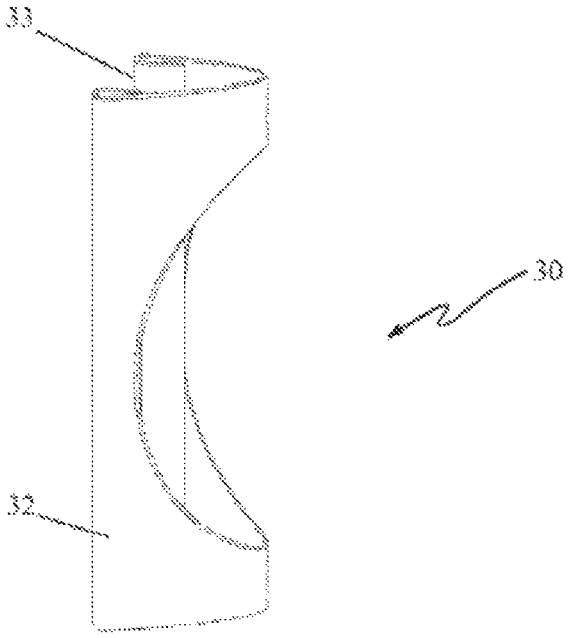
FIG. 4D is a perspective view of the frame plate of FIG. 4C in a second position.

FIGS. 4C and 4D show a frame element 30 in the form of the frame plate before being assembled with a backing plate 10. An aperture 35 is formed in the frame plate 30 allowing a picture element P to be shown. The frame plate 30 can be configured to have a curved shape. For example, the frame plate 30 can assume a radius of curvature that is conformable to a curved surface of an object, such as a tree, flower stem, a candle, a vase, a basket, a gift wrapping device, a container, a column, and furniture, to which the frame assembly is to be mounted. In the example shown in FIG. 4C, the frame plate 30 is formed to have a curved shape to conform to a curved surface of an object that the frame assembly is to be mounted onto. Such curved frame plate 30 can be adjusted, as is shown in FIG. 4D, to accommodate to variations of the curved objects.

In another example as will be explained below, the frame plate 30 can be formed to have a flat shape but bent to a desired radius of curvature prior to use. For example, the frame plate 30 can be made of a flexible material and deformed to assume a curved shape conforming to a curved surface of an object that the frame assembly is to be mounted onto. In one example, the frame plate 30 can be plastically deformed to maintain a curved shape during the normal use of the picture frame assembly.

The frame plate 30 can be formed in various ways. In one example, the frame plate 30 can be made of metal (e.g., aluminum or brass) or other rigid or deformable materials. In another example, the frame plate 30 can be formed of a flexible or elastic material (e.g., rubber, plastic, or paper) allowing the frame plate 30 to conform to various curved surfaces. In a further example, the frame plate 30 can be formed of a transparent material, such as a transparent plastic material (e.g., PMMA) and serves as a protective cover for the photograph held in the frame assembly. In the following embodiments, the frame plate 30 can be formed with parallel grooves (FIG. 6B) or cutouts (FIG. 11A) to facilitate bending. One skilled in the art will appreciate that various other methods and materials can also be used to form the frame plate 30.

The frame plate 30 can be formed to have various connecting structures to facilitate the assembling with the backing plate 10. For example, the frame plate 30 can have a pair of lateral edges 32 formed with U-shaped clips 33 for receiving the lateral edges 16 of the backing plate 10. In another example, the frame plate 30 can be attached to connecting clips that are separately formed from the frame plate 30. Additional connecting structures are provided in the various embodiments and examples described below.

FIGS. 4E to 4G show an embodiment of the backing plate 10. The backing plate 10 has a front surface 12, a rear surface 13, and a plurality of parallel grooves 14 formed in the front surface 12 with ribs 15 therebetween. The backing plate 10 has a pair of lateral edges 16 parallel to the grooves 14. While the grooves 14 are shown in the front surface 12, they can alternatively be provided in the rear surface 13.

Figure 4H:
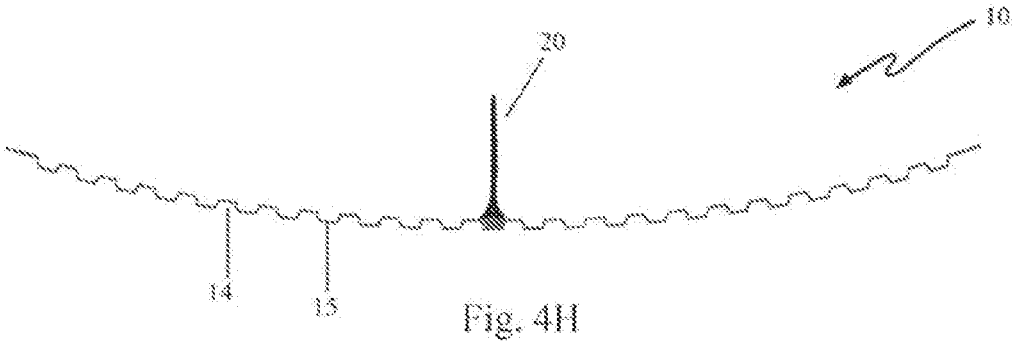
FIG. 4H is a top view of another backing plate, in which the grooves and ribs have the same width.
Figure 4I:
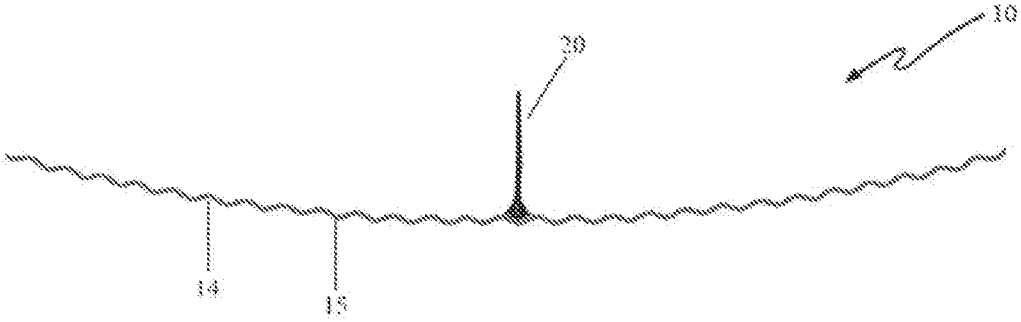
FIG. 4I is a top view of a further backing plate having grooves and ribs formed in a corrugated pattern.

The grooves 14 and ribs 15 can be formed to have various patterns. Although the example of FIG. 4E shows that the width of the grooves 14 is less than that of the ribs 15, the grooves 14 can have a larger width than the ribs 15. In the example of FIG. 4H, the grooves 14 and the ribs 15 can have the same width. In another example of FIG. 4I, the backing plate 10 is shown to be corrugated.

The material chosen for the backing plate 10, as well as its thickness and the depth of the grooves 14, are chosen to facilitate plastic deformation from the flat configuration of FIG. 4F to the curved configuration of FIG. 4G. At the same time, the ribs 15 between the grooves 14 are sufficiently stiff to resist bending about axes which are not parallel to the grooves. The material is preferably metal, such as sheet aluminum or brass, but can also be plastic. The grooves 14 can be formed by stamping (metal material), cutting, and molding. Both fastening elements 20 are preferably formed along a common bending axis parallel to the grooves.

Figure 4J:
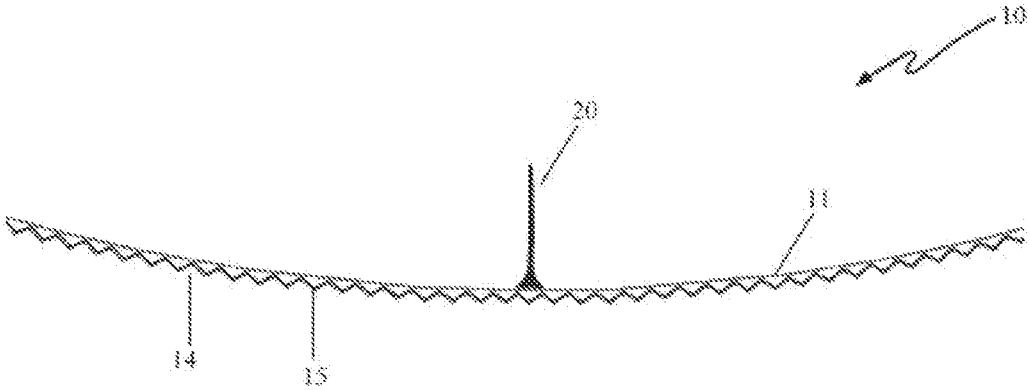
FIG. 4J is a top view of a further backing plate including a back cover.

In a preferred embodiment, the backing plate 10 can be provided with a back cover 11 covering the rear surface 13 of the backing plate 10, as is illustrated in FIG. 4J. The back cover 11 can afford additional support to the backing plate 10 and/or the picture element P. For example, the back cover 11 can be formed of any flexible material, such as sheet metal, plastic, or paper material. In one example, the back cover 11 and the backing plate 10 are joined to each other to support the picture element P against the frame element 30. If desired, the back cover 11 can bear any of various designs to enhance aesthetic appeals of the picture frame assembly.

Optionally, the backing plate 10 can be provided with elliptic lines 17, as are shown in phantom in FIG. 4E, to serve as a guide for cutting the backing plate 10 to any desired shape, in particular symmetric shapes such as an ellipse.

Figure 5A:
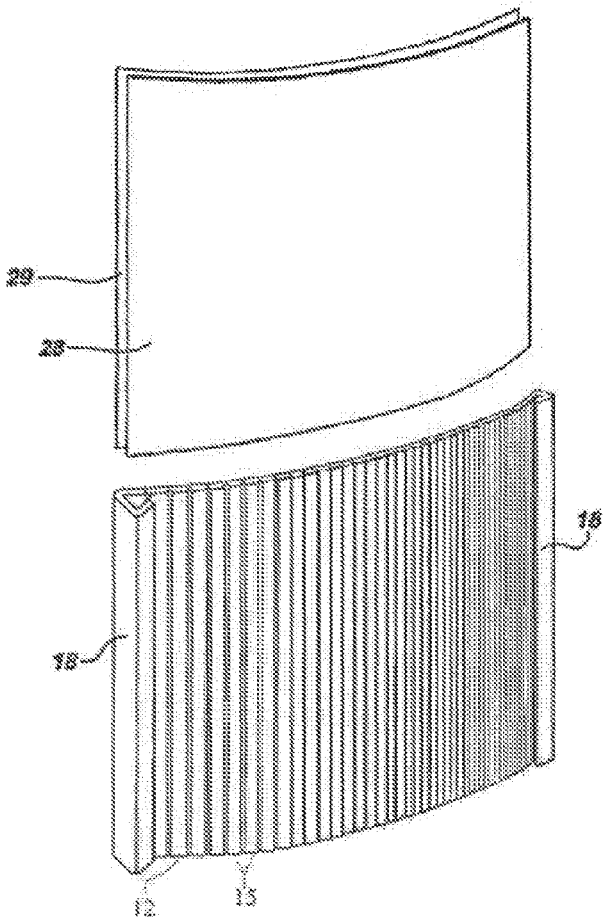
FIG. 5A is an exploded perspective view of a fifth embodiment of a picture frame assembly according to the invention.
Figure 5B:
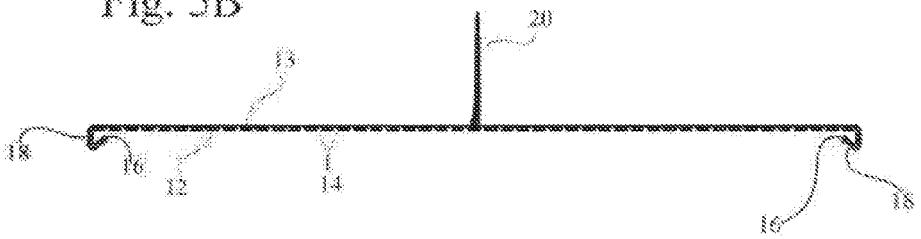
FIG. 5B is a top view of the backing plate of FIG. 5A prior to bending.
Figure 5C:
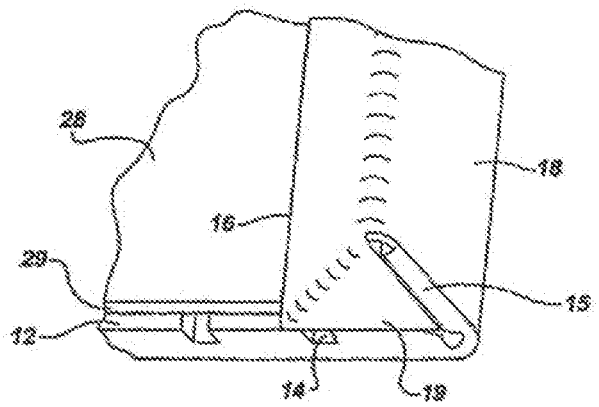
FIG. 5C is a perspective view of the retaining tab formed integrally with the frame element of FIG. 5A.

FIGS. 5A to 5C shows a fifth embodiment of a frame assembly including a backing plate 10, similarly formed to that of FIGS. 4E to 4J. In this embodiment, the lateral edges 16 of the backing plate 10 are each folded forward along the two grooves 14 adjacent to the edge 16 to form lateral frame elements 18 for retaining a picture element P, such as a photograph 29 or other display, and a transparent sheet 28 against the front surface 12. As shown in FIG. 5B, the frame elements 18 are formed prior to bending the backing plate 10 to its curved configuration.

In the embodiment shown in FIG. 5A, the transparent sheet 28 is preferably acetate or like material which does not have sufficient elasticity to reverse the plastic deformation of the backing plate 10.

As shown in FIG. 5C, each frame element 18 has at least one end formed with a retaining tab 19 which serves as a stop to prevent a picture element 29 from sliding parallel to the grooves 14. The triangular shape of the tab 19 prevents frame element 18 from being folded too far, which could overstress the thin material in the bottom of the second groove 14.

Figure 5D:
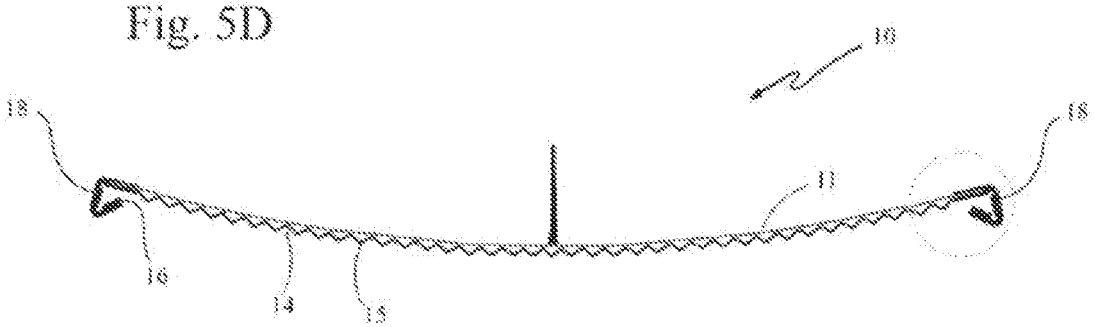
FIG. 5D is a top view of an alternative frame assembly.
Figure 5E:
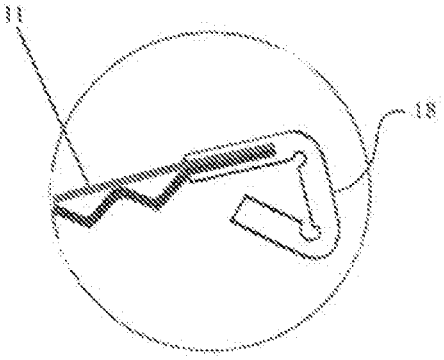
FIG. 5E is an enlarged partial view of the lateral edge of the backing plate in FIG. 5D.

FIGS. 5D and 5E shows a modified frame assembly, in which the frame elements 18 are separately formed from the backing plate 10. The lateral edges 16 of the backing plate 10 including the back cover 11 are retained inside the respective frame elements 18 by any of various conventional methods, such as molding, riveting, and screwing.

Figure 6A:
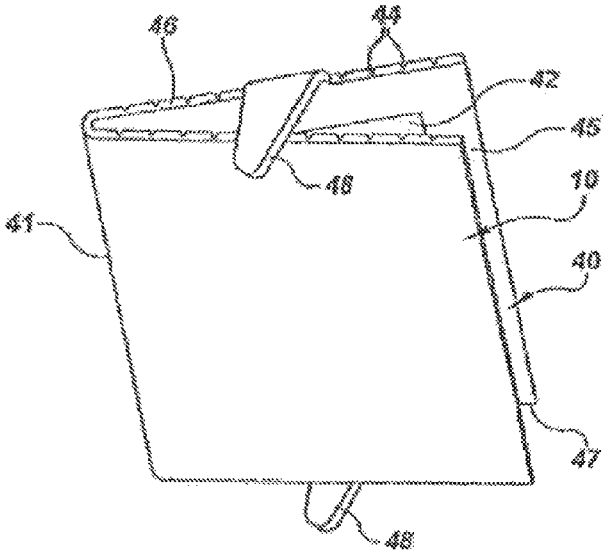
FIG. 6A is a perspective view of a sixth embodiment wherein a frame plate is integrally formed with the backing plate.

FIG. 6A shows a sixth embodiment of a picture frame assembly, wherein the frame plate 40 is formed integrally with the backing plate 10 and connected thereto by a fold 41. The frame plate 40 has an aperture 42, a front surface provided with grooves 43, and an opposed rear surface 44 which faces the front surface 12 of the backing plate 10. The top edge 46 and the bottom edge 48 are provided with retaining tabs 48 which are bent against the rear surface 13 of the backing plate 10 to secure a picture element such as a photograph between the plates 10, 40. Optionally, a transparent sheet such as sheet 28 in FIG. 5A can be also provided.

Figure 6B:
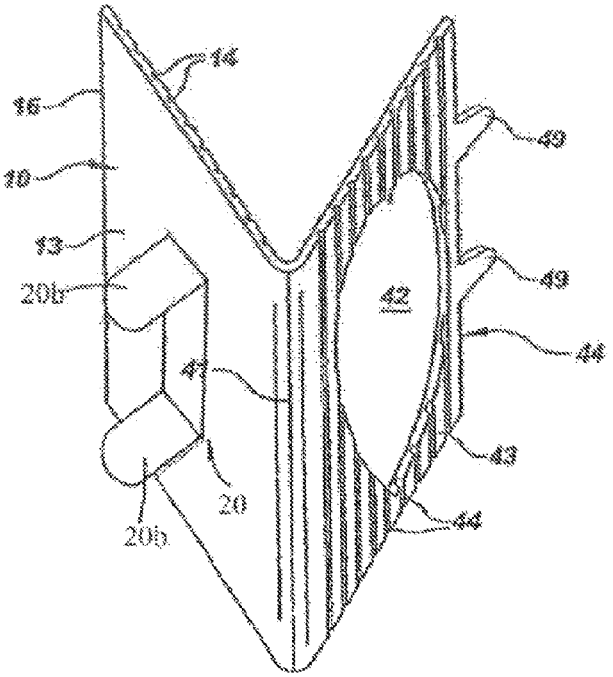
FIG. 6B is a perspective view of a modified form of the frame assembly of FIG. 6A.

FIG. 6B shows an alternative configuration wherein lateral retaining tabs 49 are provided. These tabs can also be provided in addition to the tabs 48. An alternative shape of aperture 42 is also shown.

Figure 7A:
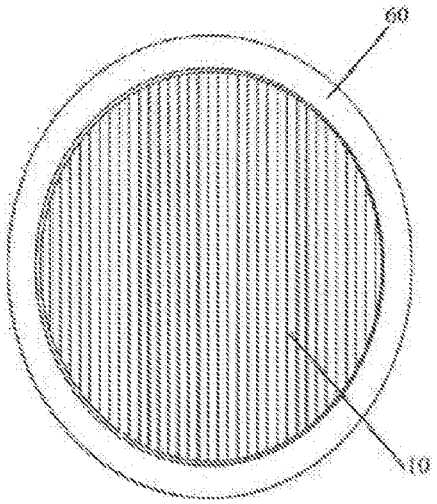
FIGS. 7A to 7D show a seventh embodiment of a frame assembly.
Figure 7B:
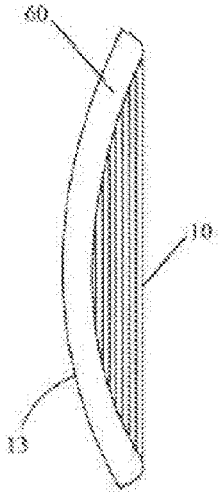

FIGS. 7A to 7D show a seventh embodiment of a frame assembly, in which the frame element 60 is curved or deformable to assume a curved shape, as is shown in FIG. 7B. For example, the frame element 60 can be in the form of a curved frame plate with a concave rear surface 13, which can conform to a cylindrical object, such as a candle. In one example, the frame element 60 is pre-curved and capable of retaining the pre-curved shape. In another example, the frame element 60 can be plastically deformed into one or more curved shapes.

Figure 7C:
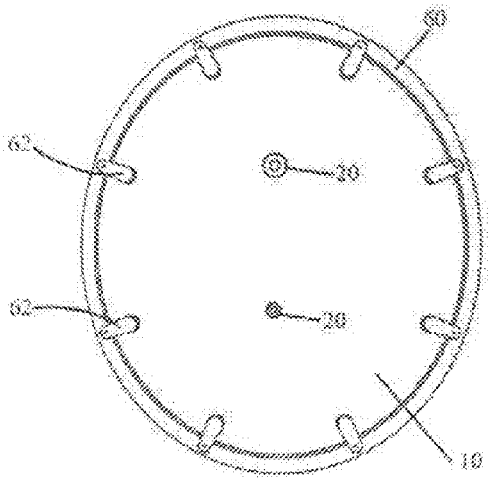
Figure 7D:
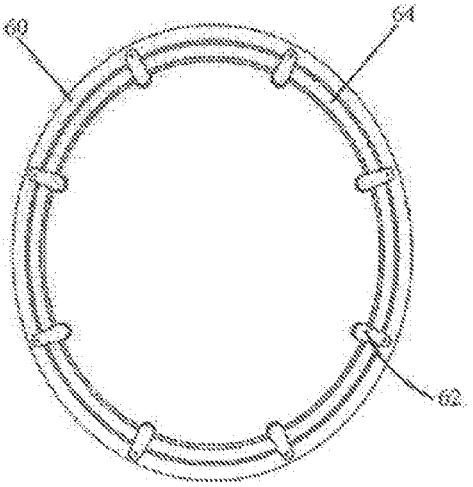

As FIG. 7C shows, a plurality of retaining tabs 62 are provided to hold the backing plate 10 against a front rim 64 of the frame element 60. Various other retaining devices, such as those described herein, can also be used to retain the backing plate 10 and the frame element 30 together.

Figure 8A:
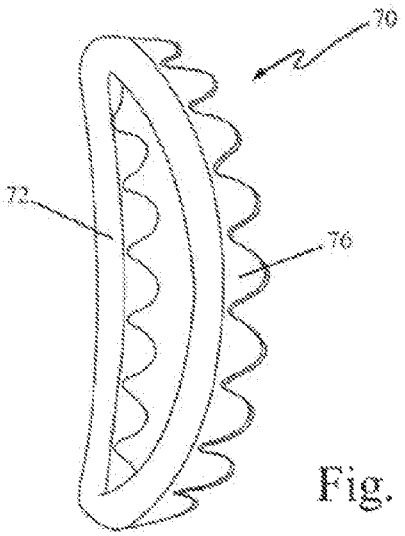
FIGS. 8A and 8B show an eighth embodiment of a frame assembly.
Figure 8B:
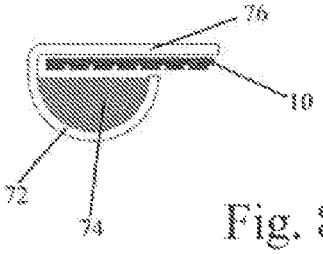

FIGS. 8A and 8B show an eighth embodiment of a frame assembly, in which the frame element 70 is formed to be deformable to assume a curved shape, as is shown in FIG. 8A. The frame element 70 is formed as an endless channel 72. In one embodiment, the channel 72 encloses one or more deformable materials 74, which can provide additional support to the channel 72. Examples of the deformable materials include, but are not limited to, foam, soft metal, plastic material, rubber, latex, fabric, silicon, gel, and sand. The deformable channel 72 cooperates with the deformable material 74 and/or a deformable backing plate 10, such as any of those described above, to form and maintain a curved shape conforming to a curved surface of the object that the frame assembly is to be mounted onto.

In the example of FIG. 8B, a plurality of retaining tabs 76 are shown to retain the backing plate 10 together with the frame element 70. The retaining tabs 76 can be integrally formed with the endless channel 72.

Figure 9A:
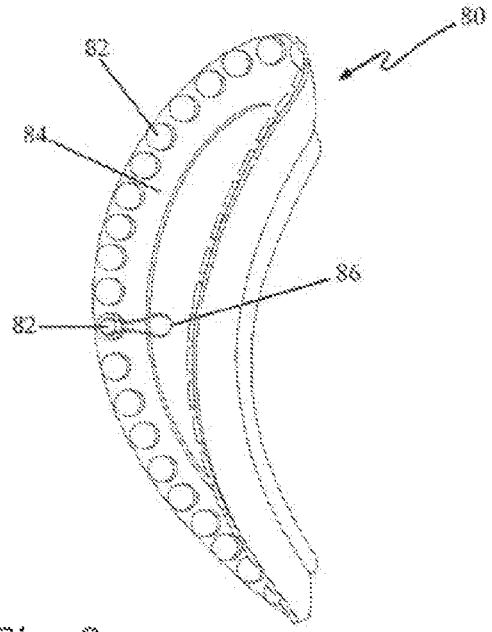
FIGS. 9A and 9B show a ninth embodiment of a frame assembly.
Figure 9B:
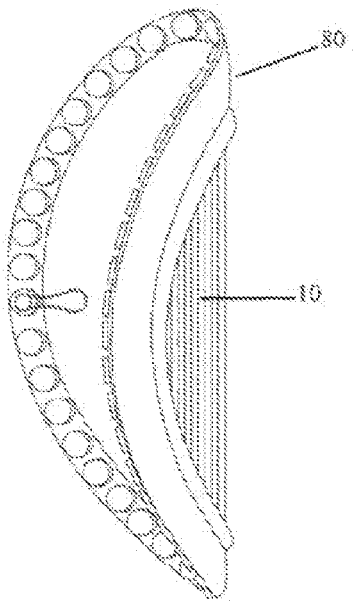

FIGS. 9A and 9B show a ninth embodiment of a frame assembly, in which the frame element 80 is formed to be deformable. In this embodiment, a plurality of projections 82 are provided on the rear surface 84 of the frame element 80 in a circumferential direction. The projections 82 can act to prevent the backing plate 10 and/or a picture element from shifting on the rear surface 84 of the frame element 80. In another example, one or more of the projections 82 are configured as anchors 82' for the retaining hooks 86, which retain the backing plate 10 in position against the frame element 80.

Additionally or alternatively, the projections 82 can add to the rigidity of the frame element 80 and allow the same to bend at the same time. In one example, the projections 82 are evenly spaced from each other. When the frame element 80 is formed to have circular shape, the frame element 80 can assume a curved profile along any radial direction of the frame element 80. Accordingly, the circular frame element 80 need not be aligned with either the picture element P or the backing plate 10 when assembling the frame assembly.

Figure 10A:
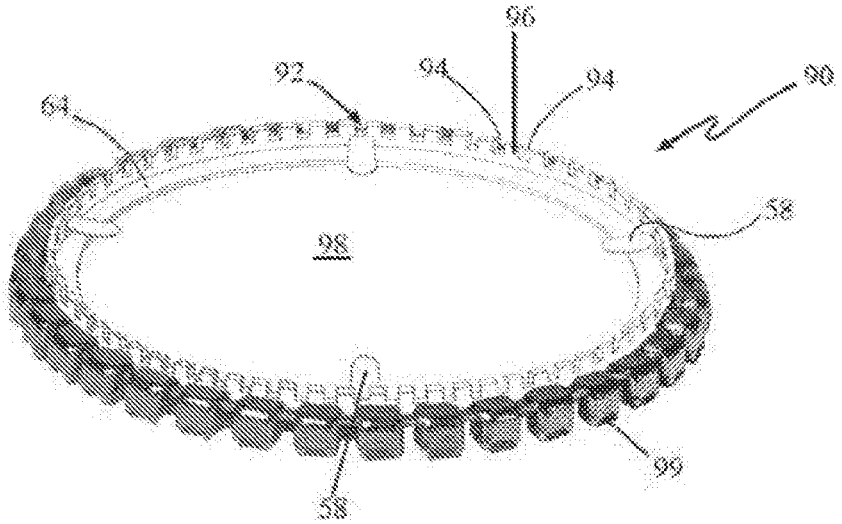
FIGS. 10A and 10B show a tenth embodiment of a frame assembly.
Figure 10B:
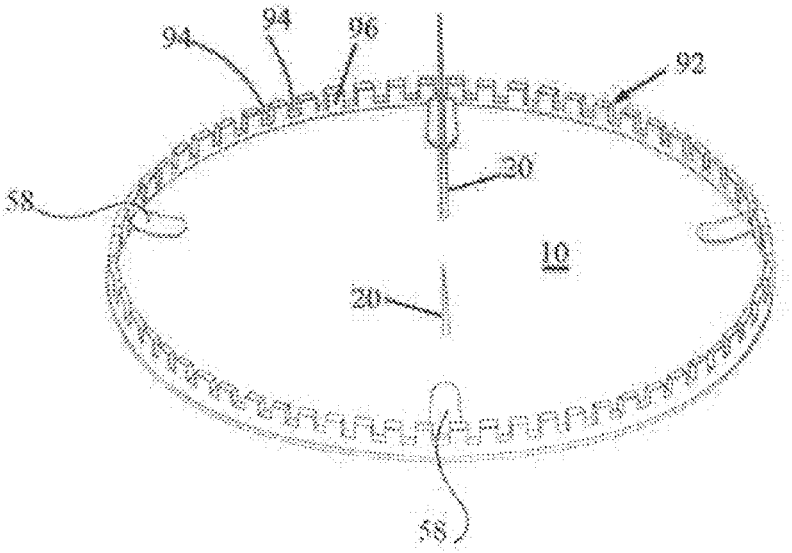

FIGS. 10A and 10B show a tenth embodiment of a frame assembly, in which the frame element 90 is deformable. In this embodiment, a deformable bezel 92 is provided and fixed to the frame element 90. The deformable bezel 92 is formed with a plurality of cutouts 94 resulting in a plurality of spaced projections 96 along the circumferential direction of the deformable bezel 92. The cutouts 94 can facilitate in the bending of the deformable bezel 92. At least some of the projections 96 have a sufficient height to retain the picture element P and the backing plate 10 in position after the picture frame assembly is assembled.

Figure 10C:
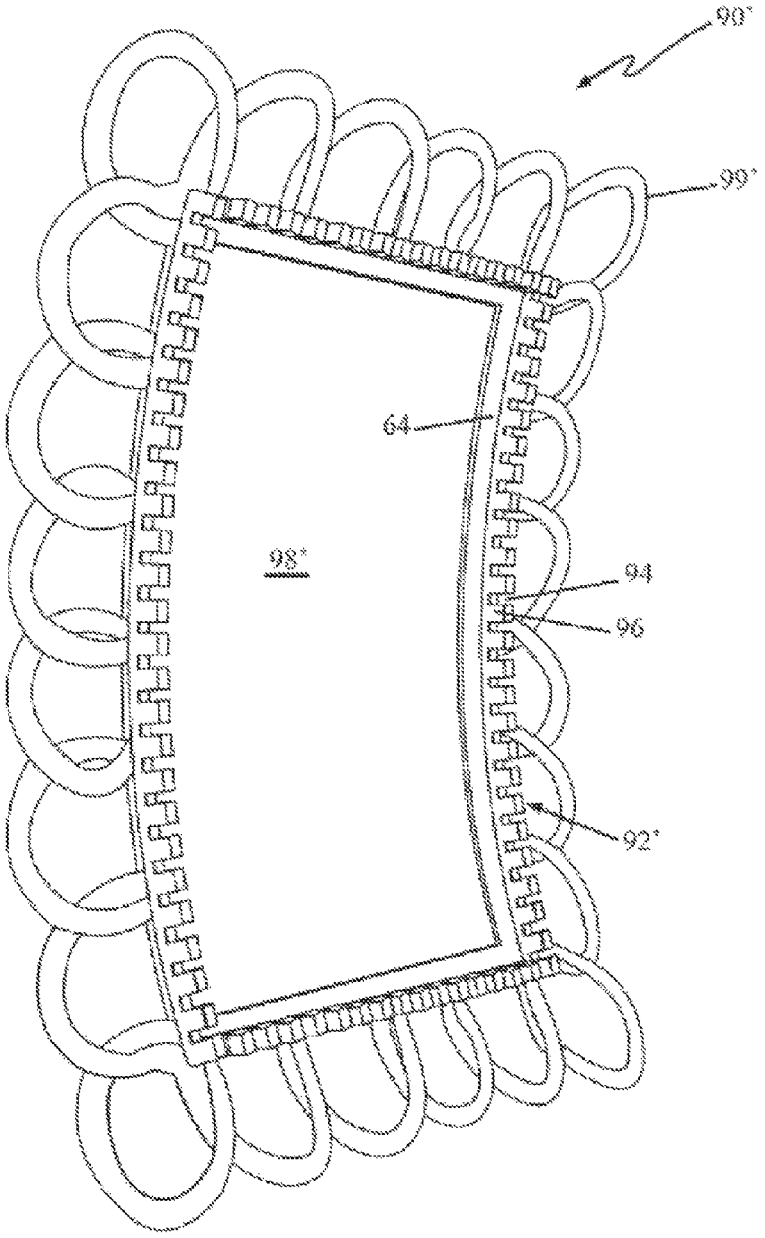
FIG. 10C shows a modified embodiment of the frame element in FIG. 10A.

The deformable bezel 92 shown in FIGS. 10A and 10B has a substantially circular or oval configuration, corresponding to a circular or oval shaped opening 98 through which a picture element P can be revealed. In a modified embodiment shown in FIG. 10C, the bezel 92' has a rectangular or square shaped opening 98', corresponding to a rectangular or square shaped opening 98' through which a picture element P can be revealed.

If desired, the frame elements 90, 90' can include various design elements 99, 99' to enhance the aesthetic appeal of the frame assembly.

Figure 11A:
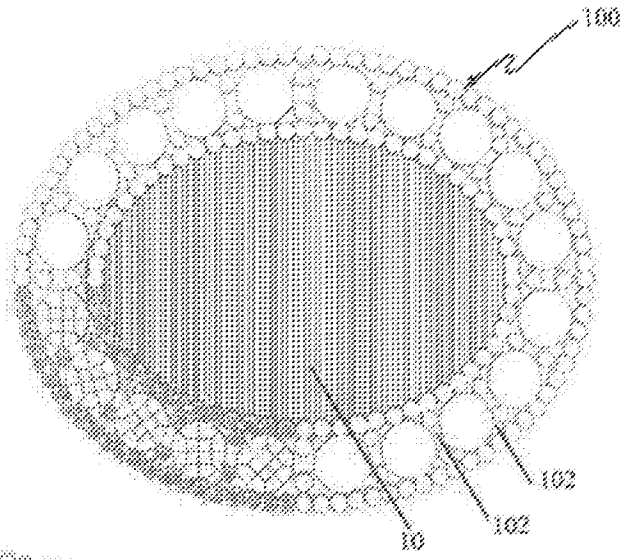
FIGS. 11A to 11C show an eleventh embodiment of a frame assembly in which the frame plate is formed with cutouts.
Figure 11B:
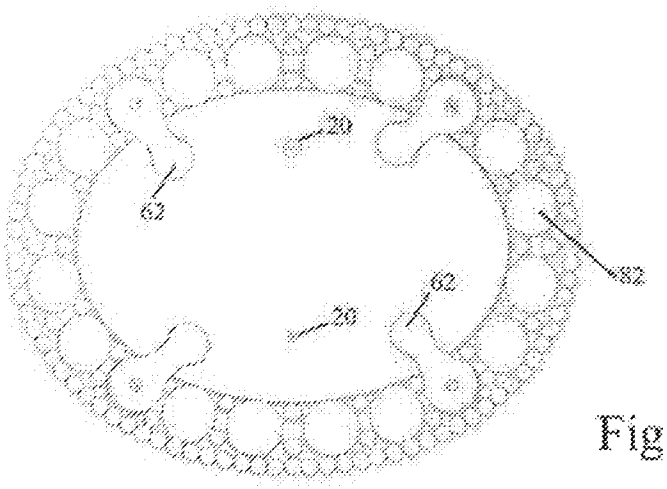
Figure 11C:
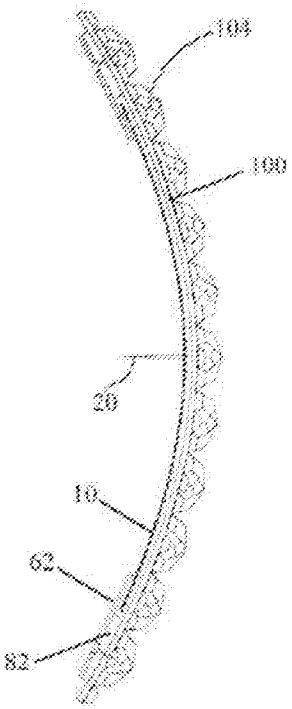

FIGS. 11A to 11C shows an eleventh embodiment of a frame assembly, in which the frame element 100 is formed with various cutouts 102 to facilitate in bending the frame element 100. The frame element 100 can be bent together with the backing plate 10 to a desired curved shape.

If desired, the various cutouts 102 can be patterned to enhance the aesthetic appeal of the frame element 100. The frame element 100 can also include additional design elements 104 to enhance the aesthetic appeal of the frame assembly.

The invention is not limited by the embodiments described above which are presented as examples only but can be modified in various ways within the scope of protection defined by the appended patent claims. In addition, the picture frame assembly can be used for various purposes including indoor or outdoor decoration or memorial. For example, the various picture frame assemblies can be readily fixed to any of various objects, such as a tree, flower stem, a candle, a vase, a basket, a gift wrapping device, a container, a column, and furniture, having either a flat or curved surface.

Thus, while there have shown and described and pointed out fundamental novel features of the invention as applied to a preferred embodiment thereof, it will be understood that various omissions and substitutions and changes in the form and details of the devices illustrated, and in their operation, can be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention can be incorporated in any other disclosed or described or suggested form or embodiment as a general matter of design choice. It is the intention, therefore, to be limited only as indicated by the scope of the claims appended hereto.

What is claimed is:

1. A picture frame assembly comprising:

at least one frame element capable of assuming a first radius of curvature of a cylindrical object;

a backing plate removably attachable to the frame element for retaining a planar picture element against the frame element, the backing plate being defined by a front surface and a rear surface and having a plurality of parallel ribs formed on one of the front and rear surfaces and defining a plurality of grooves; and a fastening element fixed to one of the frame element and the backing plate for mounting the picture frame assembly onto the cylindrical object;

wherein the backing plate is made of a material and has a thickness, the material and the thickness being chosen so that the backing plate is plastically deformed to assume a second radius of curvature which is substantially the same as the first radius of curvature of the cylindrical object.

2. The picture frame assembly of claim 1, wherein the ribs and the grooves have a substantially same width.

3. The picture frame assembly of claim 1, wherein the backing plate limber comprises a back cover joined to the rear surface of the backing plate.

4. The picture frame assembly of claim 1, wherein the backing plate has parallel lateral edges, which are bent to form a pair of frame elements, wherein each of said lateral edges face the front surface to retain a planar picture element between the lateral edges and the front surface of the backing plate.

5. The picture frame assembly of claim 1, wherein the fastening element is formed separately and attached to the rear surface of the backing plate.

6. The picture frame assembly of claim 1, wherein the frame element is capable of assuming a plurality of curved shapes with different radii of curvature.

7. The picture frame assembly of claim 1, wherein the frame element is plastically deformable.

8. The picture frame assembly of claim 1, wherein the frame element comprises:

a frame plate having a front surface, a rear surface, and an aperture for exposing a picture element therethrough; and a surrounding wall upstanding from the rear surface of the frame plate for positioning a picture element and the backing plate, the surrounding wall having an edge remote from the rear surface of frame plate and spaced therefrom for a varying distance.

9. The picture frame assembly of claim 1, wherein the frame element has a curved front surface.

10. The picture frame assembly of claim 1, wherein the frame element comprises a frame plate received against the front surface of the backing plate, the frame plate having lateral edges which are folded to form clips which receive the lateral edges of the backing plate.

11. The picture frame assembly of claim 1, wherein the frame element comprises an endless channel containing one or more deformable materials.

12. The picture frame assembly of claim 1, wherein the frame element has a rear surface and comprises a plurality of projections, the projections standing from the rear surface of the frame element and surrounding the backing plate in an assembled position.

13. The picture frame assembly of claim 1, wherein the frame element comprises:

a frame plate defining an aperture for exposing a picture element therethrough; and a surrounding wall upstanding from a surface of the frame plate for positioning the picture element and the backing plate, the surrounding wall including a plurality of cutouts spaced from each other along a circumferential direction of the surrounding wall.

14. The picture frame assembly of claim 1, wherein the frame element is formed of with a plurality of cutouts to facilitate the bending of the frame element.

15. The picture frame assembly of claim 1, wherein the fastening element is separately formed and permanently fixed to one of the frame element and the backing plate.

16. The picture frame assembly of claim 15, wherein the fastening element comprises a plurality of mounting pins of different lengths.

17. The picture frame assembly of claim 15, wherein the fastening element comprises a plurality of rigid mounting pins extending normally of a rear surface of the backing plate.

18. The picture frame assembly of claim 15, wherein the fastening element comprises a mounting prong extending normally of a rear surface of the backing plate, the mounting prong being flexible and bendable to extend substantially parallel to the rear surface of the backing plate.

19. The picture frame assembly of claim 15 further comprising a surrounding wall upstanding from a rear surface of the frame plate for positioning the picture element and the backing plate, wherein the surrounding wall having an edge remote from the rear surface of frame plate and spaced therefrom for a varying distance, and wherein the frame element is insusceptible to deformation during normal use.

20. The picture frame assembly of claim 15, wherein the fastening element comprises a plurality of mounting pins having pointed free ends.

*21. A combination of a picture frame assembly and a cylindrical object comprising:*

*at least one frame element capable of assuming a first radius of curvature of the cylindrical object;*

*a unitary backing plate removably attachable to the frame element for retaining a picture element against the frame element, the backing plate being defined by a front surface and a rear surface;*

*and a fastening element fixed to one of the frame element and the backing plate for fixedly mounting the picture frame assembly onto the cylindrical object;*

*wherein one of the front surface and the rear surface of the backing plate has a second radius of curvature which is substantially the same as the first radius of curvature of the cylindrical object, and the backing plate extends to less than the circumference of the cylindrical object.*

*22. The combination according to claim 21, wherein the frame element comprises a frame plate defining an aperture for exposing the picture element therethrough.*

*23. The combination according to claim 22, wherein the aperture comprises a transparent sheet.*

*24. The combination according to claim 21, wherein the frame element is rigid.*

*25. The combination according to claim 21, wherein the frame element comprises a frame plate and a surrounding wall that extends rearward from the periphery of the frame plate, wherein the surrounding wall has a radius of curvature that is different from the radius of curvature of the frame plate.*

*26. The combination according to claim 25, wherein the surrounding wall has a radius of curvature that is smaller than the radius of curvature of the frame plate.*

*27. A combination of a picture frame assembly and an object having a curved surface comprising:*

*at least one frame element capable of assuming a first radius of curvature of the curved surface;*

*a unitary backing plate removably attachable to the frame element for retaining a picture element against the frame element, the backing plate being defined by a front surface and a rear surface;*

*and a fastening element fixed to one of the frame element and the backing plate for fixedly mounting the picture frame assembly onto the object;*

*wherein one of the front surface and the rear surface of the backing plate has a second radius of curvature which is substantially the same as the first radius of curvature of the curved surface.*

* * * * *